Aug. 4, 1964    R. T. HURLEY    3,143,515
METHOD FOR RECLAIMING SCRAP POLYURETHANE RESINS
Filed April 18, 1956

INVENTOR.
ROY T. HURLEY
BY
AGENT

United States Patent Office 3,143,515
Patented Aug. 4, 1964

3,143,515
METHOD FOR RECLAIMING SCRAP POLYURETHANE RESINS
Roy T. Hurley, Saddle River, N.J., assignor, by mesne assignments, to Reeves Brothers, Inc., New York, N.Y., a corporation of New York
Filed Apr. 18, 1956, Ser. No. 579,028
1 Claim. (Cl. 260—2.3)

This invention relates to polyurethane-type resins and is directed particularly to a method of treating the waste and scrap material resulting from the fabrication of such resins, whereby a useful liquid resin is recovered.

Polyurethane resins are made from a variety of intermediates, including polyisocyanates and polyesters. The polyisocyanates generally used are the diisocyanates, while the polyesters are generally esters of polyfunctional alcohols with polycarboxylic acids. If a cellular or foam-like structure of the resulting polyurethane resin is desired, it is customary to add to the diisocyanate-polyester mixture an activating mixture which includes water or an equivalent hydrolyzing agent. In the resulting hydrolysis of the diisocyanate, carbon dioxide is evolved concurrently with the polycondensation of the principal reactants, whereby the desired resin foam is obtained.

In the practice of this process there is generated an appreciable quantity of scrap—in the form of waste and trimmings—the market value of which is comparatively low. It has been proposed in U.S. Patent No. 2,729,618 to reclaim such scrap by making it into useful products, heat, pressure and shaping being used to reform the material. It has also been proposed in a copending application, Serial No. 549,500 filed November 28, 1955, now Patent No. 2,998,395, to burn the scrap, which produces a liquid which can be employed as a substituent for fresh polyester in a further reaction with a polyisocyanate. The product of this burning process, although it is quite satisfactory, even superior, for certain uses, is not as desirable for other uses.

It is an object of this invention to improve the method of recovering scrap polyurethane resins, whether they be solid or foam, and particularly to improve the quality over that of the new product of the decomposition process described in the said application.

Another object is to devise apparatus adapted to the commercial operation of the invention.

According to the present invention polyurethane scrap is subjected to thermal decomposition by methods not involving oxidation. The product thus produced is superior to that produced by combustion or other oxidation processes and it may be used alone or in combination with fresh polyester in the typical reactions with polyisocyanates.

The process is carried out at temperatures between about 200° C. to 400° C. Other temperatures, outside this range can be used but they frequently require too long a time if carried out below 200° C. and result in an inferior product if carried out above 400° C. The preferred range is between 260° C. and 350° C. and in actual practice the optimum is reached between 290 C. to 310° C.

The reaction is preferably carried out in an enclosed vessel under a nitrogen or other inert gas atmosphere. The nitrogen atmosphere prevents the oxidation of the materials, improves the color, and increases the yield of the product.

It is desirable to use pressure on the material, particularly when foam scrap is being recovered. The foam is filled with cells which contain air and the air is expelled from them by the use of pressure. A satisfactory method of applying pressure is to pass the scrap to a pair of rollers at the entrance to the reaction chamber, the air being squeezed out and the material, largely free of its air, discharged within. It is a simple matter to provide sufficient sealing around such rollers and to maintain an adequate predominance of nitrogen within the chamber to prevent excessive oxidation.

A satisfactory method of heating the scrap to decomposition temperature is to pass it between heated rollers under resilient pressure. By this means uniform heat is applied to the parts of scrap and the resulting product is homogeneous. The product is a liquid which issues from between the hot rollers and is collected by any suitable means as it falls. Gases of decomposition are given off and these are allowed to escape with the current of nitrogen and may be condensed to recover the useful ingredients which have been entrained. All types of polyurethane resins can be decomposed in this way and will produce a product capable of being reacted with polyisocyanates to make new useful compounds.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention. Reference for this latter purpose being had primarily to the appended claims.

In the drawings, wherein like reference characters refer to like parts throughout the several views.

Figure 1:
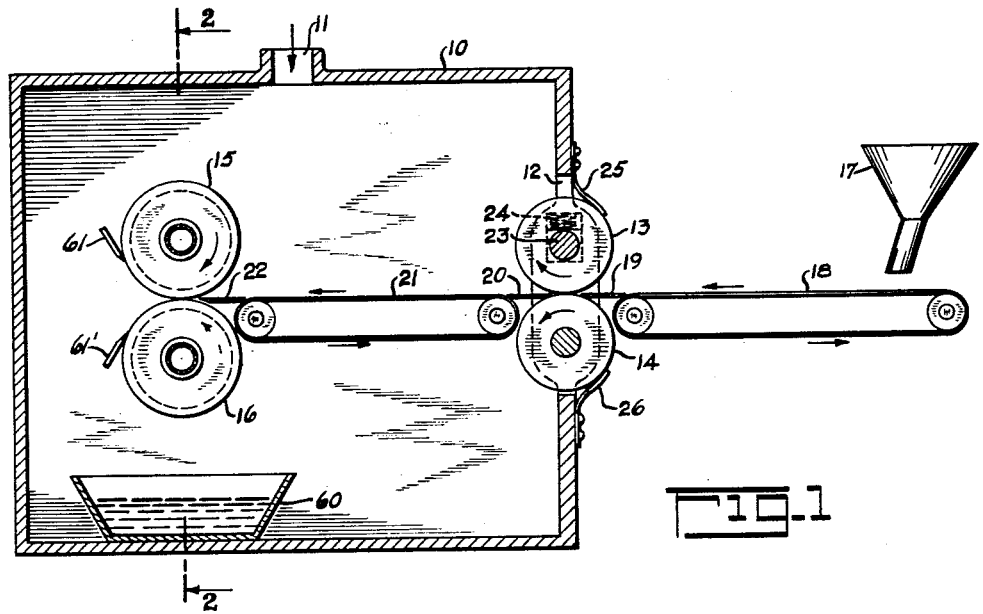
FIG. 1 is an elevation partly in section diagrammatically illustrating a perferred form of a novel apparatus for carrying out the invention.

A chamber 10, enclosed except for an opening 11 through which a current of nitrogen gas may be admitted and for an opening 12 in which is mounted a pair of rollers 13–14, has journalled therein a pair of heated rollers 15–16 which perform the decomposition of the polyurethane scrap. The polyurethane scrap fed to the apparatus is presumed, in the drawing, to have been divided into particles which are fed through a hopper 17 to a travelling belt 18 which forces it across plate 19 to the rollers 13–14 which are driven in the direction indicated in FIG. 1 (by means not shown) and which grip the scrap and compress the air out of it before forcing it across the plate 20 to the belt 21 which in turn discharges it across plate 22 to the rollers 15–16.

The roller 13 has its ends mounted in vertically movable journals 23 which are spring-pressed by springs 24 which are of sufficient force to expel most of the air from the scrap.

The exclusion of air from the inside of the chamber 10 is accomplished at the opening 12 by flexible flaps 25–26, which ride upon the surface of the rollers and cover the openings above and below them. Although such a closure is by no means impermeable, the input of nitrogen at 11 can be regulated so that the flow of gas is out at the opening 12, thus substantially excluding the oxygen of the air and preventing excessive oxidation of the product.

Figure 2:
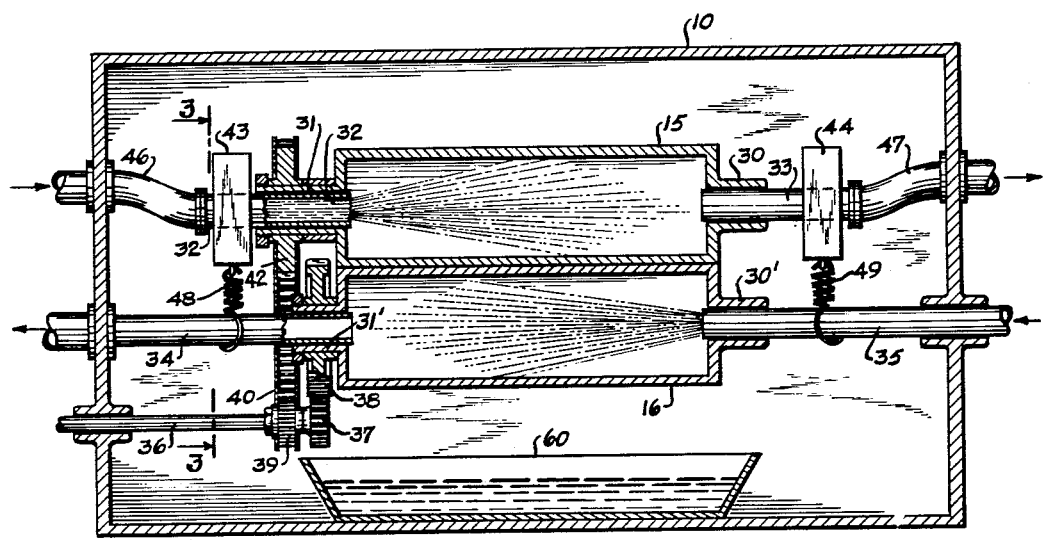
FIG. 2 is a section on the line 2 of FIG. 1.

Referring now to FIG. 2, the rollers 15–16 are hollow and have tubular hub portions 30–30′ at one end and tubular hub portions 31–31′ at the other end. The hub portions 30–31 of the roller 15 are journalled on the facing ends of tubular shafts 32 and 33 and the hub portions 30′–31′ of the roller 16 are journalled on the facing ends of tubular shafts 34 and 35. A combustible mixture is supplied through the shaft 32 to one end of the roller 15 for combustion therein, the combustion gases exhausting from the roller 15 through the shaft 33. Similarly, a combustible mixture is supplied to the roller 16 but preferably, as illustrated, to the end of roller 16 opposite to the combustion mixture supply end of the roller 15. Thus, the combustible mixture is supplied to the roller 16 through the shaft 35 and the combustion gases exhaust from this roller through the shaft 34.

A drive shaft 36 is provided for driving the rollers 15 and 16. The shaft 36 has a gear 37 meshing with a gear 38 secured to the hub 31' of the roller 16 for driving said roller. The shaft 36 also has a sprocket 39 for driving a chain 40 meshing with an idler sprocket 41 and a sprocket 42 secured to the hub 31 of the roller 15. The sprockets 39 and 42 and the gears 37 and 38 are of such size that the rollers 15 and 16 are driven at the same speed but in opposite rotative directions.

Figure 3:
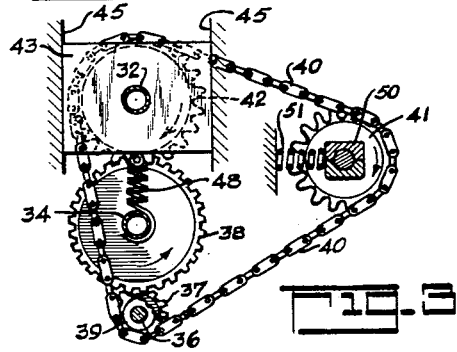
FIG. 3 is an elevational detail on line 3—3 of FIG. 2.

The roller 15 is mounted so as to permit lateral movement toward and away from the roller 16 to accommodate varying thicknesses of scrap therebetween. For this purpose the supporting shafts 32 and 33 for the roller 15 are secured to slide blocks 43 and 44 each of which is constrained to sliding movement toward and away from the fixed axis of the roller 16 by guideways 45 illustrated in FIG. 3. Attached to the shafts 32 and 33 are flexible conduits 46 and 47 to accommodate such movement. Springs 48 and 49 connect the blocks 43 and 44 to fixed structure, such as the shafts 34 and 35, for yieldably urging the roller 15 against the roller 16. The bearing 50 for the idler sprocket 41 is yieldably mounted against a spring 51 to maintain the desired slack or tautness of the chain 40 as the roller 15 moves toward and away from the roller 16.

Under the pressure and heat of the rollers 15 and 16, the scrap delivered to the rollers by the belt 21 decomposed leaving a liquid residue which drops from the rollers into the container 60. Any excess liquid clinging to the rollers 15 and 16 is removed by scraper knives 61.

The springs 48 and 49 are such as to provide that degree of pressure between the rollers 15 and 16 to produce optimum results with the type of scrap being employed. A particular advantage of the use of pressure in this way is the application of relatively uniform heat to the scrap and the decomposition thereof to a relatively uniform product.

The rolls 13–14 work satisfactorily at room temperature, but they may be heated to give a preliminary rise in temperature to the scrap, a rise which is not sufficient to induce decomposition, but which, by relieving the rolls 15–16 of the entire load of heating, enable the apparatus to be run at a much high speed.

*Example 1*

A quantity of chopped polyurethane foam resin were passed between the rollers 13–14 in the cold under a pressure of 25 lbs./sq. inch and were then admitted between rollers 15–16 in a current of nitrogen. The rollers 15–16 were heated to a temperature of about 300° C. The product was caught in a container 60 and was a liquid slightly brownish in color of unknown constitution, which is capable of being reacted with polyisocyanates under the same conditions as fresh polyester resin, but which yields a product of different properties which are in some ways superior to those obtained with fresh polyester resin.

*Example 2*

An Erlenmeyer flask of adequate size received 1000 parts by weight of solid polyurethane resin scrap, a glass stopper was fitted with an inlet for nitrogen gas and an outlet for products of decomposition mixed with nitrogen. The flask was heated to a temperature of about 300° C. until the resin had been decomposed and rested in the bottom of the flask as a yellowish liquid. The liquid was mixed with about 1400 parts of a polyester resin of fresh manufacture and the mixture was cooled and then reacted with a polyisocyanate, using standard procedures.

By this invention there is produced a product superior to that which can be produced by combustion. When this process is carried out in the open air, the product is satisfactory, is superior to that produced by combustion, but partakes of a darker color and is in some other ways inferior to the product produced in an inert atmosphere, although still superior to that produced by combustion. It is preferred to use this product in admixture with fresh polyester as such products appear to have advantages not possessed by either ingredient alone.

As many apparently widely different embodiments of the present invention may be made without departing from the spirit and scope thereof, it is to be understood that the invention is not limited to the specific embodiments.

What is claimed is:

The method of decomposing a polyurethane resin foam which comprises pressing said resin in an inert atmosphere between two bodies at least one of which is heated and thereby raising the temperature of said resin between 200° C. and 350° C. until the resin decomposes with the production of a liquid residue, and collecting the liquid residue.

References Cited in the file of this patent

UNITED STATES PATENTS

| | | |
|---|---|---|
| 2,480,851 | Goss | Feb. 5, 1947 |
| 2,518,806 | Muench | Aug. 15, 1950 |
| 2,543,530 | Kropa | Feb. 27, 1951 |
| 2,729,618 | Muller | Jan. 3, 1956 |
| 2,892,216 | Steel | June 30, 1959 |

FOREIGN PATENTS

| | | |
|---|---|---|
| 861,926 | Germany | Jan. 8, 1953 |

OTHER REFERENCES

"Laboratory Experiments in Organic Chemistry" (Adams & Johnson), published by MacMillan (New York), 4th edition, 1949, 5th printing, 1953 (page 365 relied on).

"Fibres From Synthetic Polymers," by Hill, published by Elsevier Publishing Co., 1953, pages 15, 154, 158.